(12) United States Patent
Tushinskiy (10) Patent No.: US 10,522,146 B1
(45) Date of Patent: Dec. 31, 2019

(54) SYSTEMS AND METHODS FOR RECOGNIZING AND PERFORMING VOICE COMMANDS DURING ADVERTISEMENT

(71) Applicant: INSTREAMATIC, INC., San Francisco, CA (US)

(72) Inventor: Stanislav Tushinskiy, Mountain View, CA (US)

(73) Assignee: INSTREAMATIC, INC., San Francisco, CA (US)

( * ) Notice: Subject to any disclaimer, the term of this patent is extended or adjusted under 35 U.S.C. 154(b) by 0 days.

(21) Appl. No.: 16/506,802

(22) Filed: Jul. 9, 2019

(51) Int. Cl.
*G10L 15/00* (2013.01)
*G10L 15/22* (2006.01)
*G10L 15/08* (2006.01)
*G06Q 30/02* (2012.01)
*G10L 25/78* (2013.01)

(52) U.S. Cl.
CPC .......... *G10L 15/22* (2013.01); *G06Q 30/0271* (2013.01); *G10L 15/08* (2013.01); *G10L 25/78* (2013.01); *G10L 2015/088* (2013.01); *G10L 2015/223* (2013.01)

(58) Field of Classification Search
CPC ...................................................... G10L 15/00
USPC ................ 704/251, 270.1; 705/14.66, 14.49; 715/728, 716; 455/456.3, 567
See application file for complete search history.

(56) References Cited

U.S. PATENT DOCUMENTS

| | | | | |
|---|---|---|---|---|
| 6,683,938 B1* | 1/2004 | Henderson | ............ | H04M 3/487 379/101.01 |
| 8,676,273 B1* | 3/2014 | Fujisaki | ............... | H04M 1/6505 455/567 |
| 10,186,265 B1* | 1/2019 | Lockhart | .................. | G10L 15/22 |
| 2008/0154870 A1* | 6/2008 | Evermann | ............... | G10L 15/08 |
| 2008/0290987 A1* | 11/2008 | Li | ........................... | G06Q 30/02 340/5.1 |
| 2009/0326953 A1* | 12/2009 | Peralta Gimenez | .... | G10L 15/26 704/270.1 |
| 2010/0088362 A1* | 4/2010 | Lin | ........................ | H04L 67/34 709/203 |
| 2010/0309282 A1* | 12/2010 | Hsieh | ................ | H04M 3/42017 348/14.01 |
| 2011/0066634 A1* | 3/2011 | Phillips | .................. | G10L 15/22 707/769 |
| 2011/0135283 A1* | 6/2011 | Poniatowki | .......... | H04N 21/278 386/297 |

(Continued)

*Primary Examiner* — Michael C Colucci
(74) *Attorney, Agent, or Firm* — Georgiy L. Khayet (57) ABSTRACT

Methods and systems for recognizing and performing voice commands during advertisements are provided. An example method may include playing, by an audio device, a media stream to a user, the media stream including at least one advertisement; sensing, by an acoustic sensor, an ambient acoustic signal; determining, by processors communicatively coupled to the audio device and the acoustic sensor, that the audio device has started playing the advertisement; in response to the determination, monitoring, by the processors, the ambient acoustic signal to detect a presence of at least one command spoken by the user; and in response to the detection of the presence of the at least one command, determining data associated with the at least one advertisement; and causing, by the processors, the audio device to perform one or more actions associated with the command and the data associated with the advertisement.

20 Claims, 9 Drawing Sheets

(56) References Cited

U.S. PATENT DOCUMENTS

| | | | | |
|---|---|---|---|---|
| 2011/0271194 A1* | 11/2011 | Lin | ................. | G06Q 30/0241 |
| | | | | 715/728 |
| 2012/0190386 A1* | 7/2012 | Anderson | .............. | G01C 15/04 |
| | | | | 455/456.3 |
| 2013/0263182 A1* | 10/2013 | Ivy | ...................... | H04N 21/458 |
| | | | | 725/34 |
| 2014/0122226 A1* | 5/2014 | Downing | ............ | G06Q 30/0251 |
| | | | | 705/14.49 |
| 2014/0129343 A1* | 5/2014 | Finster | ............... | G06Q 30/0269 |
| | | | | 705/14.66 |
| 2014/0129344 A1* | 5/2014 | Smith | ................ | G06Q 30/0269 |
| | | | | 705/14.66 |
| 2015/0058728 A1* | 2/2015 | Haggerty | ................ | G06Q 30/02 |
| | | | | 715/716 |
| 2018/0053507 A1* | 2/2018 | Wang | ....................... | G10L 15/22 |
| 2019/0043498 A1* | 2/2019 | Pillai | ....................... | G10L 15/22 |
| 2019/0096408 A1* | 3/2019 | Li | ........................ | G10L 17/005 |
| 2019/0208273 A1* | 7/2019 | Johnson | ........... | H04N 21/44016 |

* cited by examiner

Play, by an audio device, a media stream to a user, the media stream including at least one advertisement
405

Sense, by an acoustic sensor, an ambient acoustic signal
410

Determine, by one or more processors communicatively coupled to the audio device and the acoustic sensor, that the audio device has started playing the at least one advertisement
415

In response to the determination, monitor, by the one or more processors, the ambient acoustic signal to detect, based on the ambient acoustic signal, a presence of at least one command spoken by the user
420

In response to the detection of the presence of the at least one command, cause the audio device to perform one or more actions associated with the at least one command
425

┌─────────────────────────────────────────────────────────┐
│ Analyze the ambient acoustic signal to detect a presence of a │
│ pre-determined keyword in the ambient acoustic signal │
│ 505 │
└─────────────────────────────────────────────────────────┘
                              ↓
┌ ─ ─ ─ ─ ─ ─ ─ ─ ─ ─ ─ ─ ─ ─ ─ ─ ─ ─ ─ ─ ─ ─ ─ ─ ─ ─ ─ ┐
  Upon detection of the presence of the at least one keyword,
│ cause the audio device to lower a level of sound of the media │
  content
│ 510 │
└ ─ ─ ─ ─ ─ ─ ─ ─ ─ ─ ─ ─ ─ ─ ─ ─ ─ ─ ─ ─ ─ ─ ─ ─ ─ ─ ─ ┘
                              ↓
┌─────────────────────────────────────────────────────────┐
│ Analyze a portion of the ambient acoustic signal after the pre- │
│ determined keyword to recognize the at least one command │
│ 515 │
└─────────────────────────────────────────────────────────┘

```
┌─────────────────────────────────────────────────────────┐
│ Compare the portion of the ambient acoustic signal to one or │
│         more phrases stored in a local vocabulary        │
│                          605                             │
└─────────────────────────────────────────────────────────┘
                             │
                             ▼
┌─────────────────────────────────────────────────────────┐
│ Determine that the portion of the ambient acoustic signal does │
│ not match the one or more phrases stored in the local vocabulary │
│                          610                             │
└─────────────────────────────────────────────────────────┘
                             │
                             ▼
┌─────────────────────────────────────────────────────────┐
│   In response to the determination, compare the portion of the │
│   ambient acoustic signal to one or more phrases stored in a │
│                     remote vocabulary                    │
│                          615                             │
└─────────────────────────────────────────────────────────┘
```

Perform speech recognition of an audio data of the media stream to determine data associated with the advertisement, wherein the audio data corresponds to the advertisement
705

Determine further data associated with the advertisement based on metadata of the media stream
710

Prior to causing the audio device to perform the actions, modify the at least one command based on the data or the further data associated with the at least one advertisement
715

SYSTEMS AND METHODS FOR RECOGNIZING AND PERFORMING VOICE COMMANDS DURING ADVERTISEMENT

TECHNICAL FIELD

This disclosure generally relates to the field of providing advertisements. More particularly, this disclosure relates to methods and systems for recognizing and performing voice commands during advertisements.

BACKGROUND

Media streams can be broadcast on many users' devices, such as smart television sets, computers, tablets, vehicle audio systems, and so forth. Media streams may include advertisements featuring products and services, such as restaurants, films, automobiles, banking and financial services, insurance services, and so forth. The media stream and the advertisements can be in audio format or video format. In some instances, even if interested in purchasing the product or service from the advertisements, the user may not be able to memorize or use the information placed in advertisement because, for example the user may be driving a car, cooking in the kitchen, performing physical exercises, and so forth. There is a need for a convenient way for response and interaction with the advertisements.

SUMMARY

This section introduces a selection of concepts in a simplified form that are further described in the Detailed Description section, below. This summary does not identify key or essential features of the claimed subject matter and is not intended to be an aid in determining the scope of the claimed subject matter.

This present disclosure is directed to systems and methods for recognizing and performing voice commands during advertisements. Some embodiments of the present disclosure may facilitate users to respond to advertisements during media streams played by users' devices.

According to one example embodiment, a system for recognizing and performing voice commands during an advertisement is provided. The system may include an audio device configured to play a media stream to a user, wherein the media stream includes at least one advertisement. The system may include at least one acoustic sensor configured to sense an ambient acoustic signal. The system may include one or more processors communicatively coupled to the audio device and the acoustic sensor. The processors can be configured to determine that the audio device has started playing the advertisement. In response to the determination, the processors may monitor the ambient acoustic signal to detect a presence of at least one command spoken by the user. In response to the detection of the presence of the one command, the processors may cause the audio device to perform one or more actions associated with the command.

The media stream may include metadata indicative of starting the at least one advertisement. The determination that the audio device has started playing the advertisement can be based on the metadata.

The processors can be configured to analyze audio data of the media stream. The determination that the audio device has started playing the advertisement can be based on the analysis of the audio data.

The detection of the presence of the at least one command may include analyzing the ambient acoustic signal to detect a presence of a pre-determined keyword in the ambient acoustic signal. Upon detection of the presence of the at least one keyword, the processors may proceed with analyzing a portion of the ambient acoustic signal after the pre-determined keyword to recognize the command. Upon detection of the presence of the pre-determined keyword, the processors may cause the audio device to lower a level of sound of playing the media stream.

The detection of the presence of the command may include comparing a portion of the ambient acoustic signal to one or more phrases stored in a local vocabulary. The local vocabulary can be stored in a memory of the audio device.

After determining that the audio device has started playing the at least one advertisement, the processors can detect a presence of at least one clue in the advertisement. In response to the detection of the clue, the processor may monitor the ambient acoustic signal to detect, based on the ambient acoustic signal, a presence of at least one keyword spoken by the user. The keyword can be associated with the at least one clue. In response to the detection of the presence of the keyword, the processors may cause the audio device to perform one or more actions associated with the clue.

The processors can be communicatively connected to at least one remote computing source. The remote computing source can be configured to store a remote vocabulary. The remote vocabulary can be larger than the local vocabulary. The one or more processors can be configured to determine that the portion of the ambient acoustic signal does not match the phrases stored in the local vocabulary. In response to the determination, the processors can be configured to compare the portion of the ambient acoustic signal to one or more phrases stored in the remote vocabulary.

The processors can be configured to determine data associated with the advertisement. Prior to causing the audio device to perform the actions, the processors may modify the command based on the data associated with the advertisement.

The processors can be configured to perform speech recognition based on an audio data of the media stream. The audio data may correspond to the advertisement. The processors may determine, based on results of the speech recognition, the data associated with advertisement.

The media stream may include metadata including the data associated with the advertisement. The processors can be configured to determine the data associated with the advertisement based on the metadata of the media stream.

The data associated with the advertisement may include one or more of the following: a phone number, an Internet address of a website of a company, a name of a product or a service, a type of the product or the service, a name of a company, and a street address of the company.

The performing one or more actions corresponding to the command may include one or more of: making a call to a phone number, opening a browser at the Internet address of the website, displaying a map showing the address of the company, displaying a driving direction to the street address of the company, and displaying an information concerning the product or the service in the browser.

The acoustic sensor and the processors can be integrated in the audio device. The audio device may include one of: a smart phone, a smart television set, a tablet computer, a desktop computer, in-vehicle infotainment, and a smart home device.

The media stream may include an Internet radio stream or an Internet television stream broadcast live online. The media stream may include a podcast.

According to another example embodiment, a method for recognizing and performing voice commands during an advertisement is provided. The method may include playing, by an audio device, a media stream to a user, wherein the media stream includes at least one advertisement. The method may include sensing, by at least one acoustic sensor, an ambient acoustic signal. The method may include determining, by one or more processors communicatively coupled to the audio device and the acoustic sensor, that the audio device has started playing the advertisement. In response to the determination, the method may include monitoring, by the processors, the ambient acoustic signal to detect, based on the ambient acoustic signal, a presence of at least one command spoken by the user. In response to the detection of the presence of the command, the method may include causing, by the processors, the audio device to perform one or more actions associated with the command.

The detection of the presence of the command may include analyzing the ambient acoustic signal to detect a presence of a pre-determined keyword in the ambient acoustic signal. Upon detection of the presence of the keyword, the method may include analyzing a portion of the ambient acoustic signal after the pre-determined keyword to recognize the command.

The method may include determining data associated with the advertisement. The data associated with the advertisement can be determined by performing speech recognition of audio data of the media stream, wherein the audio data correspond to the advertisement. The data associated with the advertisement can be determined by reading metadata of the media stream. The method may include, prior to causing the audio device to perform the actions, modifying the command based on the data associated with the advertisement.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The technology described herein is concerned with systems and methods for recognizing and performing voice commands during advertisements. Some embodiments of the present technology may facilitate interaction of a user with an advertisement during media streams played on a user device.

According to an example embodiment of the present disclosure, an audio device for recognizing and performing voice commands during advertisements is provided. The audio device may include an output device configured to play a media stream to a user. The media stream may include at least one advertisement. The audio device may include at least one acoustic sensor configured to sense an ambient acoustic signal. The audio device may further include one or more processors communicatively coupled to the output device and the acoustic sensor. The processors can be configured to determine that the output device has started playing the advertisement. In response to the determination, the processors can monitor the ambient acoustic signal to detect a presence of a predetermined keyword spoken by the user in the ambient acoustic signal. In response to the detection of the presence of the pre-determined keyword, the processors can cause the output device to lower a level of a sound of playing the media stream. The processors may further analyze a portion of the ambient acoustic signal after the pre-determined keyword to recognize at least one command. Upon recognition of the command or concurrently to, the processors may determine data associated with the advertisement. The data associated with the advertisement can be determined by performing speech recognition of audio data of the media stream, such that the audio data corresponds to the advertisement. Additionally, or alternatively, processors may read metadata of the media stream to determine the data associated with the advertisement. The processors may further perform one or more actions associated with the one or more command and the data associated with the at least one advertisement.

Figure 1:
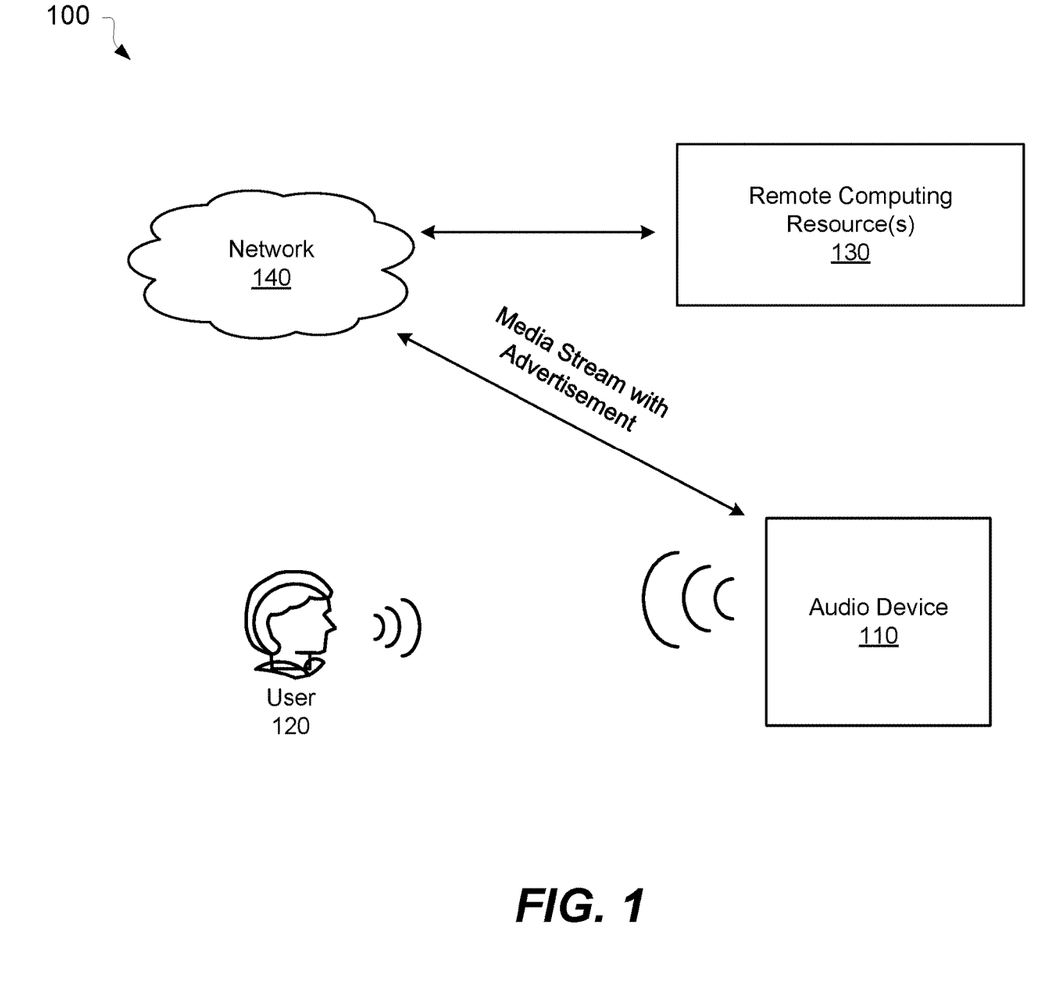
FIG. 1 is a block diagram showing an example environment wherein a method for recognizing and performing voice commands during an advertisement can be implemented.

Referring now to the drawings, FIG. 1 shows an example environment 100, wherein a method for recognizing and performing voice commands during advertisements can be implemented. The environment 100 may include an audio device 110, a user 120, a remote computing resource(s) 130, and a network 140.

The audio device 110 can include radio frequency receivers, transmitters, and transceivers, wired and/or wireless telecommunications and/or networking devices, amplifiers, audio and/or video players, encoders, decoders, speakers, inputs, outputs, storage devices, user input devices. The audio device 110 can be configured to receive a media stream and play the media stream to a user using an output device, for example speakers and earphones. The audio device 110 can be configured to sense ambient acoustic sound using, for example one or more microphones. The audio device 110 can be configured to detect the voice of the user 120. The audio device 110 may include, but is not limited to, a notebook computer, a desktop computer, a tablet computer, a phablet, a smart phone, a personal digital assistant, a media player, a mobile telephone, a smart television set, in-vehicle infotainment, a smart home device, and the like. An example audio device 110 is described in detail in FIG. 2.

The media stream may include a live broadcast, including a live radio, a live television, an Internet radio, an Internet television, a live stream in one of the social media, and so forth. The media stream can be streamed in analog format or digital format. The media stream may also include a podcast stored locally in a memory of the audio device 110 or remotely in the remote computing resource(s) 130.

The media stream may include one or more advertisements. The advertisement may include an audio data and/or video data. The advertisement may feature product and services and provide data associated with the advertisement concerning the advertisement provider, such as a phone number, Internet address of a website, a street address, name of a company, and so forth. In some embodiments, the media stream may include metadata that contain the data associated with the advertisement.

In some embodiments, the audio device may include a radio receiver to receive the media stream using a radio network or a television network. In certain embodiments, the media stream can be delivered using a data network 140. The data network 140 can refer to any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network, packet switching communications network, circuit switching communications network), Bluetooth™ radio, Ethernet network, an IEEE 802.11-based radio frequency network, a Frame Relay network, Internet Protocol (IP) communications network, or any other data communication network utilizing physical layers, link layer capability, or network layer to carry data packets, or any combinations of the above-listed data networks. In some embodiments, the data network 140 includes a corporate network, data center network, service provider network, mobile operator network, or any combinations thereof.

In some embodiments, the remote computing resource(s) 130 may be implemented as server(s) or cloud-based computing resource(s) shared by multiple users. The remote computing resource(s) 130 can include hardware and software available at a remote location and accessible over the network 140. The remote computing resource(s) 130 can be dynamically re-allocated based on demand. The cloud-based computing resources may include one or more server farms/clusters including a collection of computer servers which can be co-located with network switches and/or routers.

The remote computing resource(s) 130 can be configured to transmit media streams over the network 140. The remote computing resource(s) 130 can be configured to store podcasts to be played on the audio device 110 via the network 140.

Figure 2:
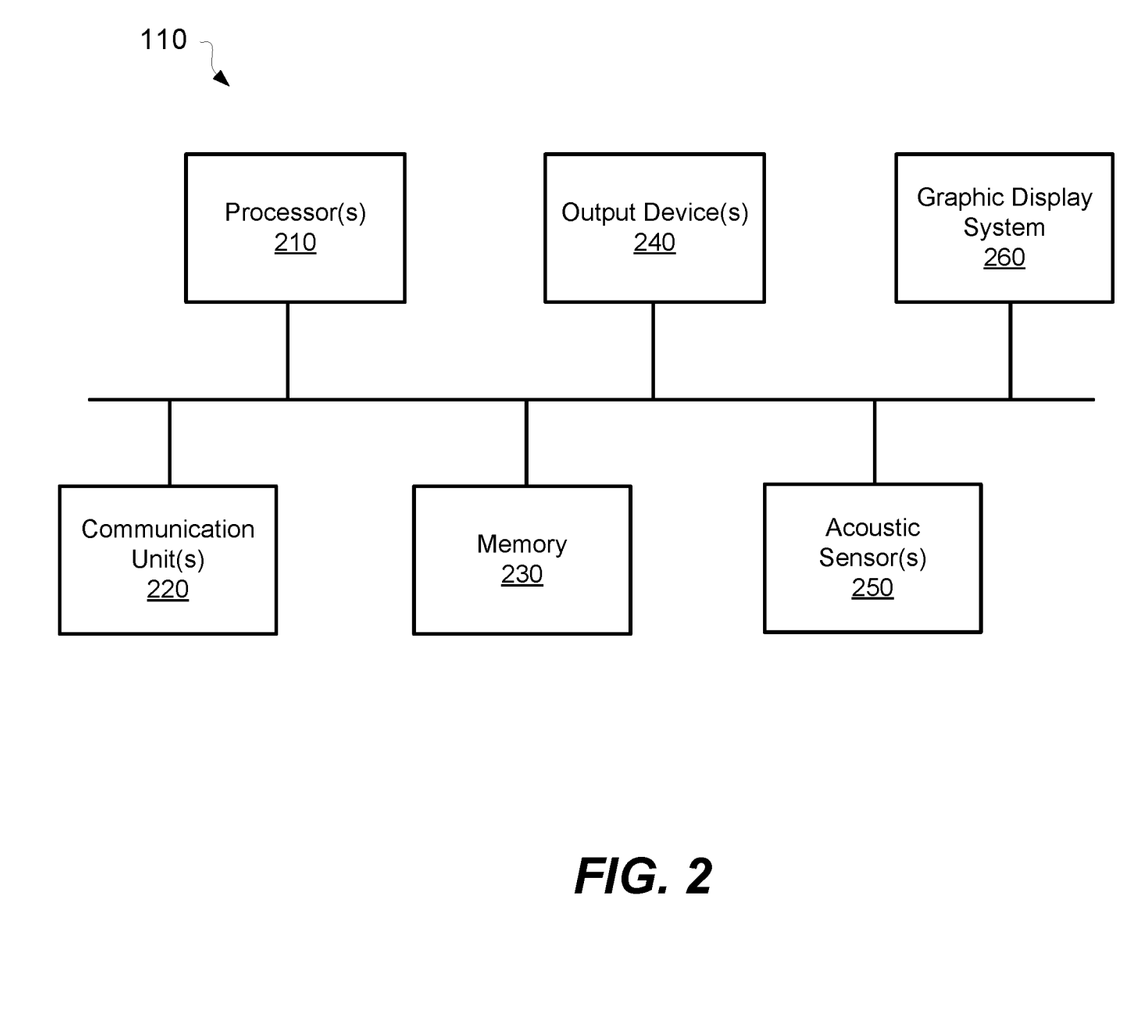
FIG. 2 is a block diagram showing an audio device for recognizing and performing voice commands during an advertisement, according to an example embodiment.

FIG. 2 is a block diagram showing an audio device 110 for recognizing and performing voice commands during advertisements, according to an example embodiment. FIG. 2 provides details of the audio device 110 of FIG. 1. In the illustrated embodiment, the audio device 110 includes one or more processor(s) 210, one or more communication unit(s) 220, a memory 230, one or more output device(s) 240, one or more acoustic sensor(s) 250, and a graphic display system 260. In other embodiments, the audio device 110 includes additional or other components necessary for operations of audio device 110. Similarly, in certain embodiments, the audio device 110 includes fewer components that perform functions similar or equivalent to those depicted in FIG. 2.

In various embodiments, the processors 210 include hardware and/or software, which is operable to execute instructions stored in the memory 230. The processors 210 may perform floating point operations, complex operations, and other operations, including analyzing the media streams to detect advertisements and determine data associated with advertisements and performing speech recognition based on ambient acoustic signals to detect commands spoken by users. The processors 210 may include general purpose processors, video processors, audio processing systems, and so forth.

In various embodiments, the communication unit(s) 220 can be configured to communicate with a network such as the Internet, WAN, LAN, cellular network, and so forth, to receive audio and/or video data of media streams. The received audio and/or video data may be then forwarded to the processor(s) 210 and the output device(s) 240. The processors 210 may analyze the received media stream to detect a beginning of an advertisement and determine data associated with the advertisement.

The acoustic sensor(s) 250 can include one or more microphones. The processors 210 can be configured to receive acoustic signals from an acoustic source, for example the user 120, via acoustic sensor(s) 250 and process the acoustic signal to determine presence of keywords and commands in a voice of the user 120. The acoustic sensor(s) 250 can be spaced a distance apart to allow the processor(s) 210 to perform a noise and/or echo reduction in received acoustic signals.

In some embodiments, the output device(s) 240 may include any device which provides an audio output to a listener (for example, the user 120). The output device(s) 240 may comprise one or more speaker(s), an earpiece of a headset, or a handset.

In various embodiments, the graphic display system 260 can be configured to provide a graphic user interface. In some embodiments, a touch screen associated with the graphic display system 260 can be utilized to receive an input from a user. The graphic display system 260 may be configured to display a video content of the media stream including advertisements.

Figure 3:
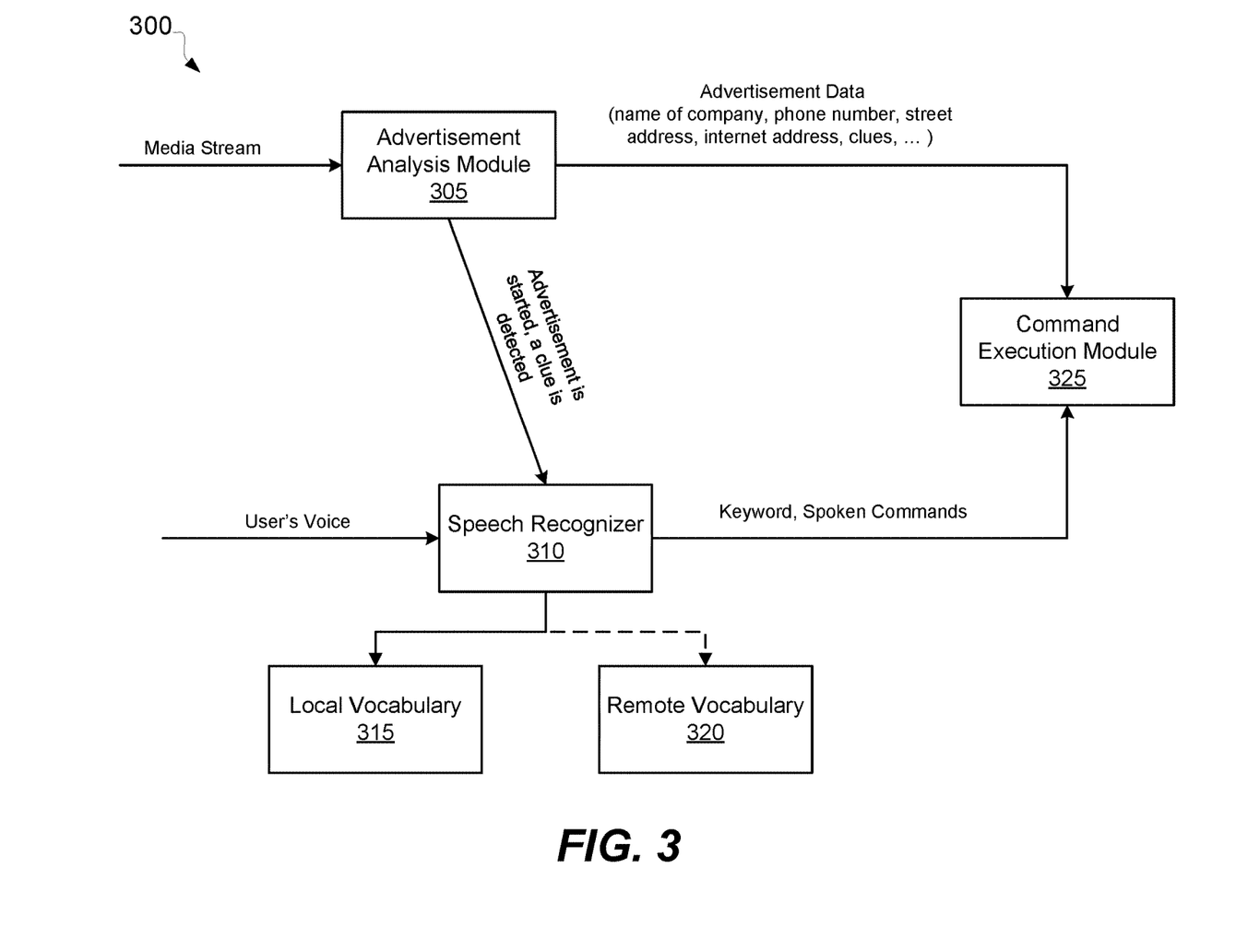
FIG. 3 is a block diagram illustrating an example system for recognizing and performing voice commands during an advertisement, according to an example embodiment.

FIG. 3 is a block diagram illustrating an example system 300 for recognizing and performing voice commands during an advertisement, according to an example embodiment. The system 300 may include an advertisement analysis module 305, a speech recognizer 310, and a command execution module 325. In certain embodiments, the modules 305, 310, and 325 can be implemented as instructions stored in memory 230 of audio device 110 and executed by processor(s) 210 (shown in FIG. 2). In some embodiments, the system 300 may include a local vocabulary 315 stored in a memory 230 of the audio device 110 and a remote vocabulary 320 stored outside of the audio device 110, for example, in remote computing resource(s) 130.

The advertisement analysis module 305 can be configured to monitor a media stream played by the audio device 110. The module 305 can be configured to detect that the audio device 110 has started playing an advertisement within the media stream. In some embodiments, the module 305 can determine a start of an advertisement based on a change of audio content in the media stream. For example, the module 305 can detect change of amplitude or frequency in a pre-determined number of time frames of an audio signal. The module 305 may detect an increase of a level of sound of playing the media content. In some embodiments, a time of a beginning of the advertisement can be provided in metadata of the media stream. The module 305 may detect the beginning of an advertisement based on the metadata. The module 305 may further provide an indication that the audio device has started playing the advertisement to the speech recognizer 310.

After determining that the audio device has started playing the advertisement, the module 305 may be configured to analyze a portion of the media stream that corresponds to the advertisement to determine data associated with the advertisement. The data associated with the advertainment may include information concerning advertisement provider, for example a phone number, an Internet address of a website, a name of a product or a service, a type of the product or the service, a name of company, a street address of the company, and so forth. The module 305 can provide the data associated with advertisement to the command execution module 325.

The data associated with the advertisement may include text data pronounced during the advertisement. The module 305 may be configured to recognize the text data based on audio data of the media stream to determine the data associated with the advertisement.

The data associated with the advertisement can be provided in metadata of the media stream. The module 305 can be configured to detect the metadata in the media stream and read the data associated with the advertisement from the metadata.

Upon receiving an indication that the audio device 110 has started playing an advertisement, the speech recognizer 310 can be configured to analyze an ambient acoustic signal sensed by acoustic sensor(s) 250 of the audio device 110. In certain embodiments, the speech recognizer 310 may configure the output device(s) 240 of the audio device 110 to lower a level of sound of playing the media stream for a pre-determined time. The pre-determined time can be larger than a duration of the advertisement in the media stream.

The speech recognizer 310 may detect a presence of a voice of the user 120 in the ambient acoustic signal. The speech recognizer 310 may also detect a presence of a pre-determined keyword in the voice of the user. The pre-determined keyword may include a key phrase such as "Hey, Radio," "Hey, TV," and so forth. The speech recognizer 310 can be configured to recognize similar key phrases pronounced in various languages different from English. Upon detection of the pre-determined keyword, the speech recognizer 310 can analyze a portion of the ambient acoustic signal after the pre-determined keyword to determine whether the user has spoken one or more commands. If the speech recognizer 310 does not detect presence of the key phrase such as "Hey, Radio," "Hey, TV," and others in the voice of the user, the speech recognizer 310 skip any words spoken by the user 120 during advertisement. In this case, any words spoken by the user 120, even if present in the ambient acoustic signal, are considered to be irrelevant to the played advertisement and, therefore, the speech recognizer 310 does not perform any speech recognition analysis of the ambient acoustic signal. The commands can include some pre-determined words, such "call the phone in advertisement," "call to" following the name of the company in the advertisement, "open the website," "make a note," "make a reminder," and so forth.

The speech recognizer 310 can be configured to compare a portion of the ambient acoustic signal to one or more phrases stored in local vocabulary 315. If speech recognizer 310 does not determine any phrases in local vocabulary that correspond to the portion of the ambient acoustic signal, the speech recognizer 310 may send the portion to the remote computing resource(s), wherein the portion can be recognized based on a remote vocabulary. The remote vocabulary can be larger than the local vocabulary. The speech recognizer 310 may provide the recognized command to the command execution module 325.

The command execution module 325 can be configured to cause the audio device 110 to perform one or more actions in response to receiving the recognized command and the data associated with the advertisement. In some embodiments, the recognized command can be modified based on the data associated with the advertisement. For example, a phone number or an Internet address can be added to the recognized command. In some embodiments, the module 325 can be configured to execute the recognized command by launching one or more applications of the audio device, such as a phone application, an e-mail client, an Internet browser, a calendar, a messenger, and so forth. The execution of command may include making a call to a phone number indicated in the advertisement, opening a browser at the Internet address of a website provided in the advertisement, displaying a map showing the street address of a company, displaying a driving direction to the street address of the company, and displaying an information concerning the product or the service in the browser.

In some embodiments, the module 325 can be configured to send the recognized command and the data associated with the advertisement to a further device of the user. The further device can be communicatively connectable and paired via a network with the audio device 110. The further device can be configured to execute the commands received from the audio device. In some embodiments, the module 325 can be configured to send the recognized command and the data associated with the advertisement to an application located in remote computing resource(s) and associated with the user of the audio device 110.

In some embodiments, the advertisement may include one or more clues for the user. The clues may include a prompt for the user to respond to the advertisement. For example, the clues may include phrases such as "Call now", "Contact us for your free quote . . . ", "Ask your doctor for . . . ", "Visit us at . . . ", and so forth. The clues can be associated with one or more commands. A user may respond to the clue with one or more keywords or phrases, such as "Yes", "Yes, I want it", "Call them", "Open", "Open the website", and so forth. In these embodiments, the advertisement analysis module 305 can be configured to detect a presence of a clue in the media stream during advertisement. The clue can be detected based on analysis of audio data of the media. The clues can be also detected based on the metadata in the media stream. The module 305 may provide an indication of detection of a clue to the speech recognizer 310. The module 305 may provide the detected clue to the command execution module 325.

The speech recognizer 310 may monitor the ambient acoustic signal to detect a presence of one of keywords associated with the clue in a voice of the user. The speech recognizer 310 may monitor the ambient acoustic signal for a pre-determined time (for example, 10 seconds) after the clue is detected. In certain embodiments, the speech recognizer 310 may monitor the ambient acoustic signal for a pre-determined time (for example, 10 seconds) after the advertisement has been played. Upon detection of keywords associated with the clue, the speech recognizer 310 may provide the detected keywords to command execution module 325. While monitoring the ambient acoustic signal, the audio device may continue playing the media stream. Optionally, a level of sound of playing of the media stream can be lowered or the sound of the media stream can be switched off after detecting the clue in the advertisement and while the speech recognizer 310 monitors the ambient acoustic signal.

Upon receiving the clue and keywords associated with the clue, the command execution module 325 can execute one or more commands associated with the clue. The commands associated with the clue can be determined based on text analysis of audio data of the advertisements. The commands associated with the clue can be provided via metadata of the media stream. While executing the commands, the audio device may continue playing the media stream. The command execution module 325 may provide sound messages over the media stream. The sound messages may include confirmation that a command is received and scheduled to be executed. The sound message may include phrases, such as "Ok. Opening the website.", "Ok. Calling to number", and so forth.

Figure 4:
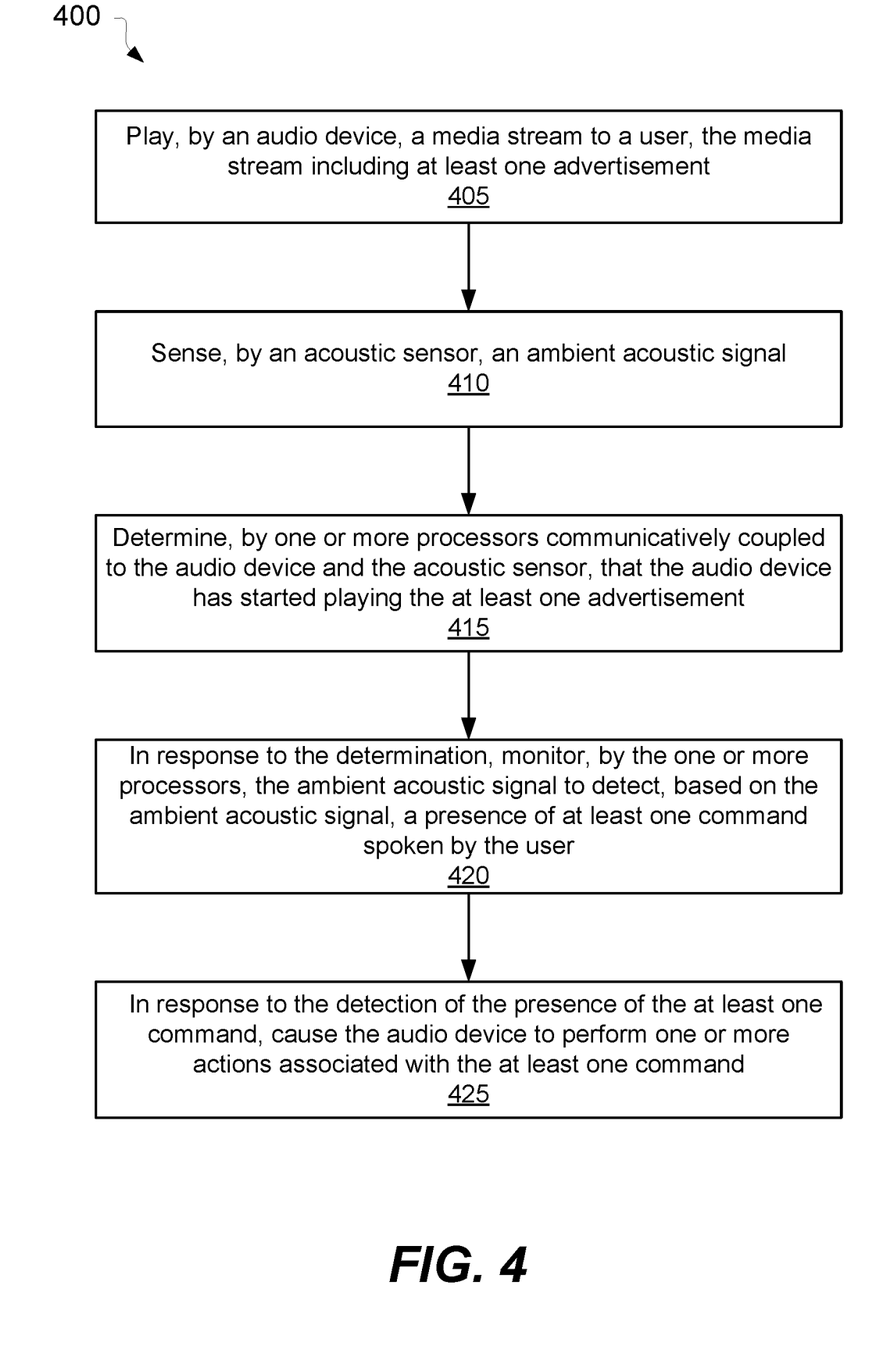
FIG. 4 is a flow chart showing a method for recognizing and performing voice commands during an advertisement, according to an example embodiment.

FIG. 4 is a flow chart showing a method 400 for recognizing and performing voice commands during advertisements, according to an example embodiment. The method can be implemented by using the audio device 110 shown in FIG. 1 and FIG. 2. For example, the method 400 can be implemented as instructions stored in memory of the audio device 110 which when being executed by the processors of the audio device causing the audio device to perform the operations of the method 400. In some embodiments, the operations of method 400 may be combined, performed in parallel, or performed in a different order. The method 400 may also include additional or fewer operations than those illustrated.

The method 400 may commence in block 405 with playing, by an audio device, a media stream to a user. The media stream may include audio data and/or video data. The media stream may include at least one advertisement. The media stream may include metadata. The metadata can include data associated with the advertisement.

In block 410, the method 400 may include sensing, by an acoustic sensor, an ambient acoustic signal.

In block 415, the method 400 may include determining, by one or more processors communicatively coupled to the audio device and the acoustic sensor, that the audio device has started playing the advertisement. The processors can be configured to determine that the audio device has started playing the advertisement by determining a change in audio data and/or video data in the media stream. The processors may also determine that the audio device has started playing the advertisement by reading metadata of the media stream.

In block 420, the method 400 may include, in response to the determination that the audio device has started playing the advertisement, monitoring, by the one or more processors, the ambient acoustic signal to detect a presence of at least one command spoken by the user. The operations of block 420 are described in detail in FIG. 5 and FIG. 6.

In block 420, the method 400 may include, in response to the detection of the presence of the command, causing the audio device to perform one or more actions associated with the command. Prior to the causing the audio device to perform the actions, the method 400 may include additional operations described in FIG. 7.

Figure 5:
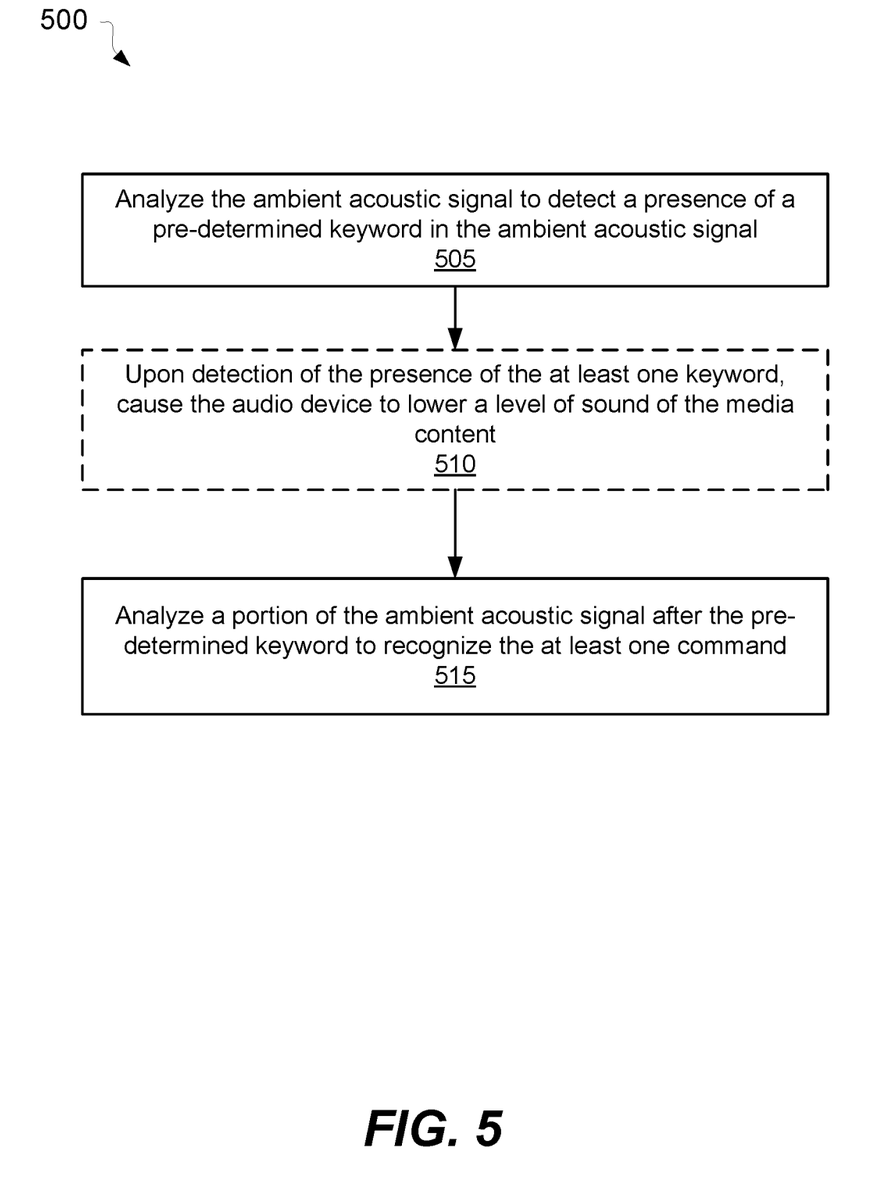
FIG. 5 is a flow chart showing a method for recognizing voice commands during an advertisement, according to an example embodiment.

FIG. 5 is a flow chart showing a method for recognizing voice commands during advertisement, according to an example embodiment. The method of FIG. 5 may provide details for operation 420 of the method 400 of FIG. 4.

The method 500 may commence in block 505 with analyzing the ambient acoustic signal to detect a presence of a pre-determined keyword in the ambient acoustic signal. The pre-determined keyword may include "Hey, Radio!," "Hey, TV!," or a similar phrase.

In optional block 510, the method 500 may include, upon detection of the presence of the at least one keyword, causing the audio device to lower a level of sound of the media stream.

In block 515, the method 500 may further include analyzing a portion of the ambient acoustic signal after the pre-determined keyword to recognize at least one command. Details of the operations of block 515 of the method 500 are described in detail in FIG. 6.

Figure 6:
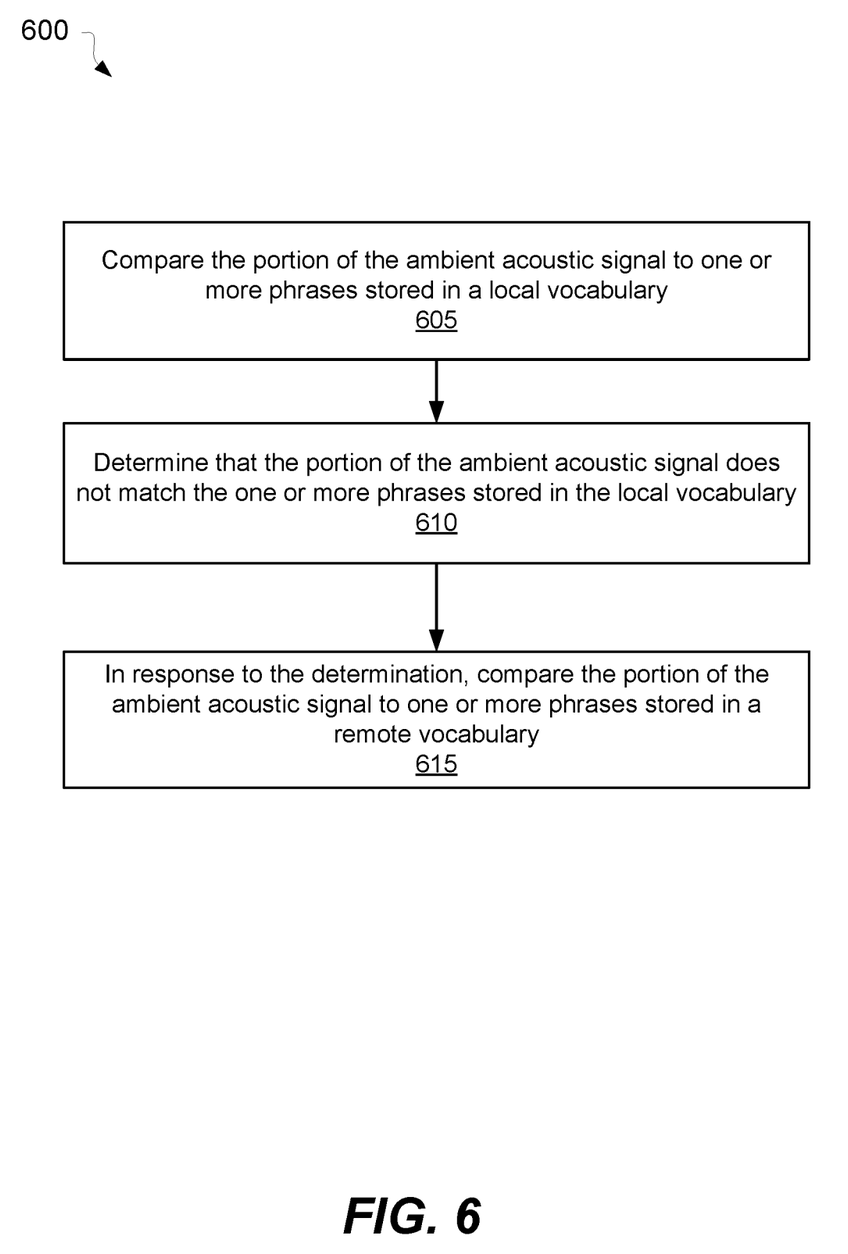
FIG. 6 is a flow chart showing a method for recognizing voice commands during an advertisement, according to an example embodiment.

FIG. 6 is a flow chart showing a method 600 for recognizing voice commands during advertisements, according to an example embodiment. The method 600 provides details for operations of block 515 of the method 500 of FIG. 6.

The method 600 may commence in block 605 with comparing the portion of the ambient acoustic signal to one or more phrases stored in a local vocabulary. The local vocabulary can be stored in a memory of the audio device.

In block 610, the method 600 may include determining that the portion of the ambient acoustic signal does not match the phrases stored in the local vocabulary.

In block 615, the method 600 may include, in response to the determination, comparing the portion of the ambient acoustic signal to one or more phrases stored in a remote vocabulary. The remote vocabulary can be stored in one or more remote computing resource(s). The remote vocabulary can be larger than the local vocabulary. The audio device can be in communication with the remote computing resource(s). The audio device can be configured to send the portion of the ambient acoustic signal to the remote computing resource(s). The remote computing resource(s) can be configured to compare the portion of the ambient acoustic signal to phrases in the remote vocabulary and send results of the comparison to the audio device. The result of the comparison may include a text phrase that matches the portion of the ambient acoustic signal with the best score. The result may include two or more text phrases and corresponding scores. The scores may indicate probabilities of matching the portion of the ambient acoustic signal to text phrases. The audio device may further select the best matched phrase based on context of the advertisement.

Figure 7:
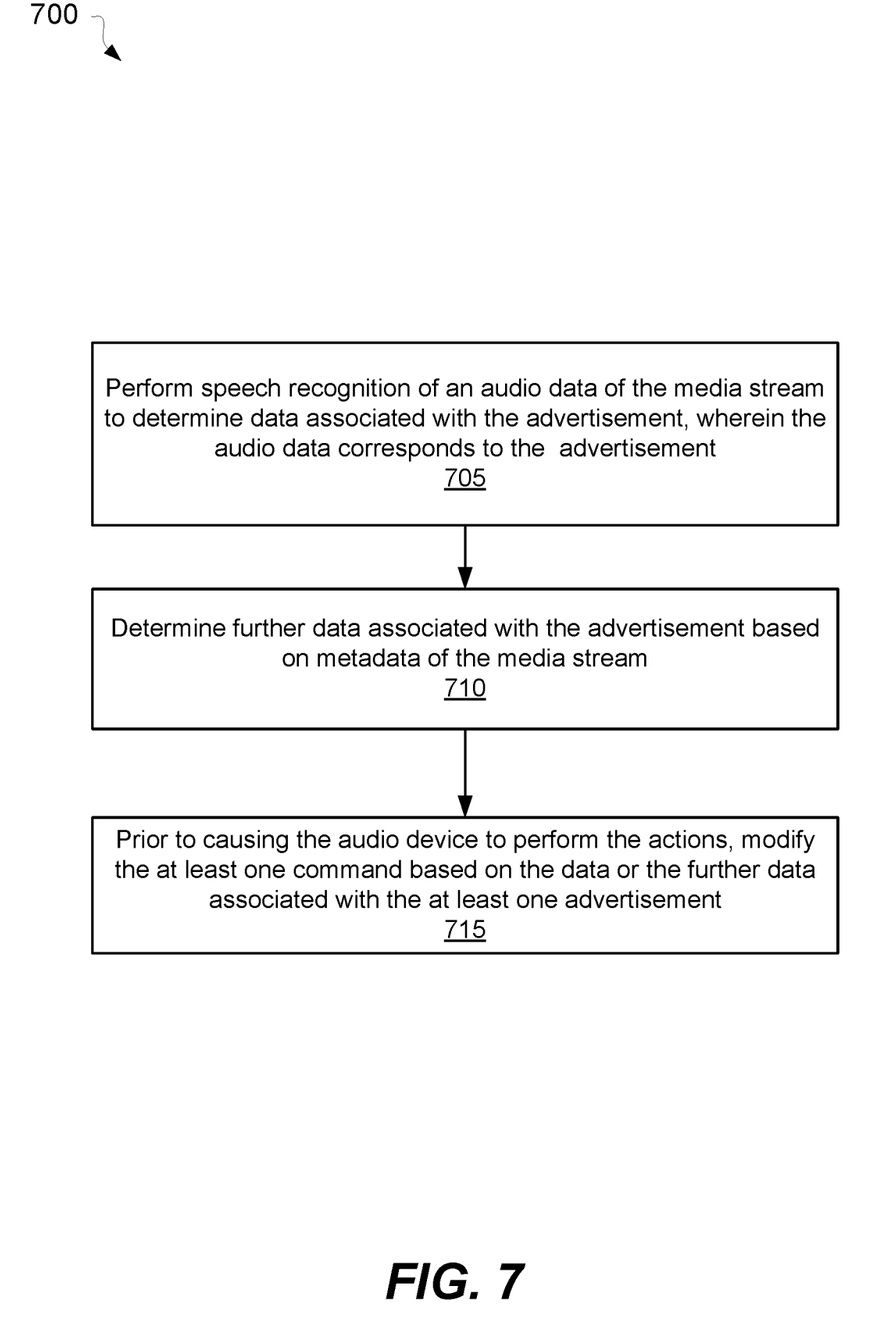
FIG. 7 is a flow chart showing a method for determining data associated with an advertisement, according to an example embodiment.

FIG. 7 is a flow chart showing a method 700 for determining data associated with an advertisement, according to an example embodiment. The method 700 may represent additional operations of method 400 of the FIG. 4 upon determination that the audio device has started playing the advertisement. The operations of the method 700 can be carried out prior to the operation of block 425 of method 400.

The method 700 may commence in block 705 with performing speech recognition of an audio data of the media stream to determine data associated with the advertisement. The audio data may correspond to a portion of a media stream containing the advertisement.

In block 710, the method 700 may include determining further data associated with the advertisement based on metadata of the media stream. The data and further data associated with the advertisement may include a phone number, an Internet address, a name of product or a service, a type of the product or the service, a name of company, and a street address of the company, and so forth. It should be noted that method 700 may include only operations of block 705, only operations of block 710, or both the operations of block 705 and the operations of block 710.

In block 715, the method 700 may include, prior to causing the audio device to perform the actions, modifying the command based on the data or the further data associated with the advertisement. The command may include making a call to the phone number, opening a browser at the Internet address of a website, displaying a map showing the address of the company, displaying a driving direction to the street address of the company, displaying an information concerning the product or the service in the browser, and so forth.

Figure 8:
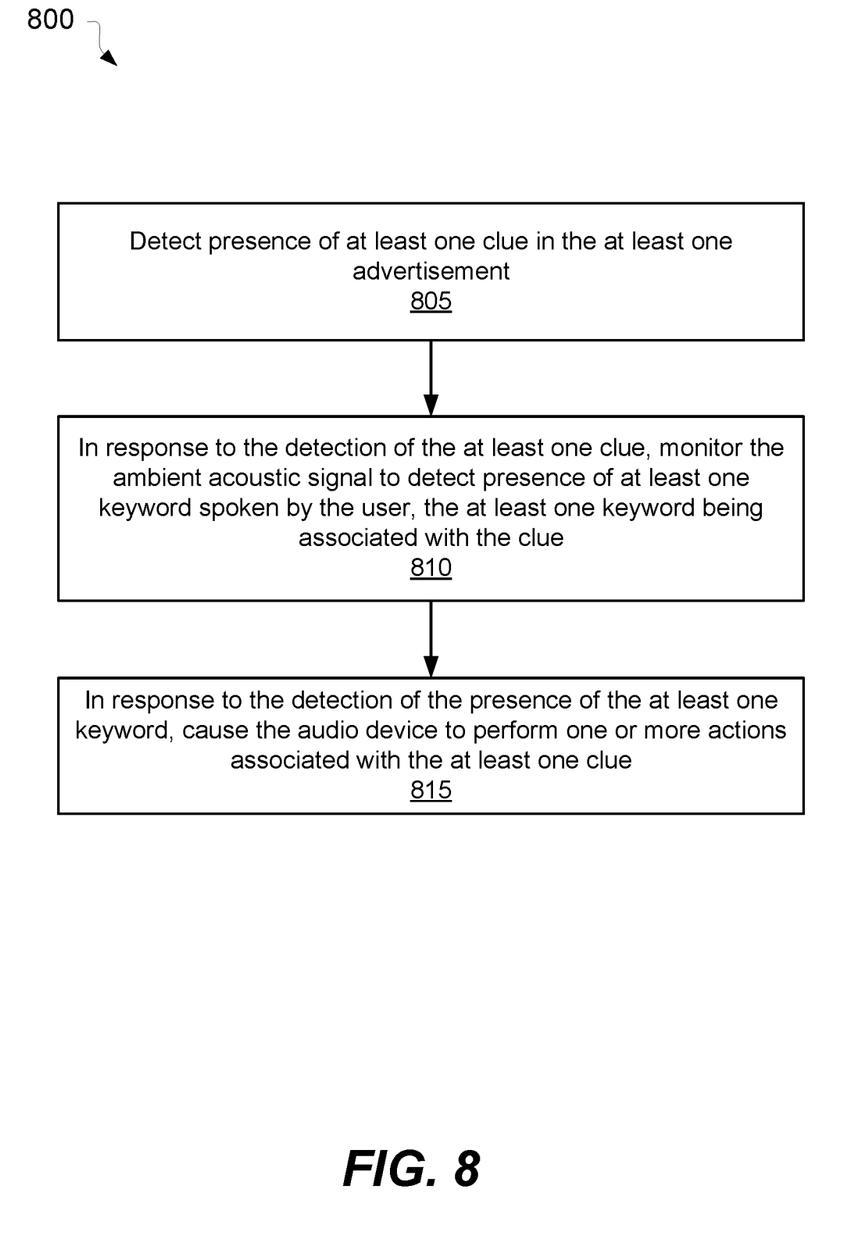
FIG. 8 is a flow chart showing a method for recognizing and performing voice commands during an advertisement, according to an example embodiment.

FIG. 8 is a flow chart showing a method 800 for recognizing and performing voice commands during advertisements, according to an example embodiment. The method 800 may provide additional steps to method 400 illustrated in FIG. 400.

The method 800 may commence, in block 805, with detecting a presence of at least one clue in the at least one advertisement. The advertisement can be played by an audio device while playing a media stream.

In block 810, the method 800 may proceed, in response to the detection of the at least one clue, with monitoring an ambient acoustic signal to detect, based on the ambient acoustic signal, a presence of at least one keyword spoken by the user. The at least one keyword can be associated with the clue.

In block 815, the method 800 may proceed, in response to the detection of the presence of the at least one keyword, with causing the audio device to perform one or more actions associated with the clue.

Figure 9:
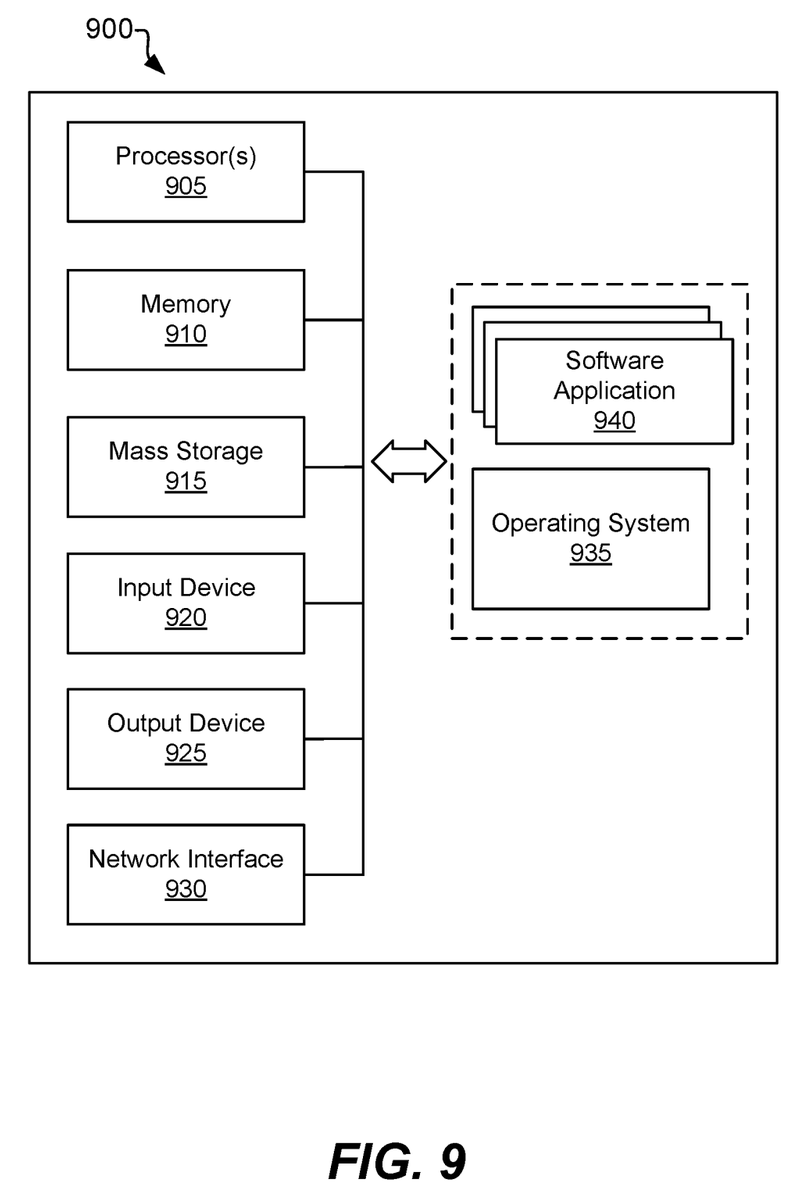
FIG. 9 is a high-level block diagram illustrating an example computer system, within which a set of instructions for causing the machine to perform any one or more of the methodologies discussed herein can be executed.

FIG. 9 is a high-level block diagram illustrating an example computer system 900, within which a set of instructions for causing the machine to perform any one or more of the methodologies discussed herein can be executed. The computer system 900 may include, refer to, or be an integral part of, one or more of a variety of types of devices, such as a general-purpose computer, desktop computer, laptop computer, tablet computer, netbook, mobile phone, smartphone, personal digital computer, smart television device, and server, among others. In some embodiments, the computer system 900 is an example of audio device(s) 110 or remote computer resource(s) 130. Notably, FIG. 9 illustrates just one example of the computer system 900 and, in some embodiments, the computer system 900 may have fewer elements/modules than shown on FIG. 9 or more elements/modules than shown on FIG. 9.

The computer system 900 includes one or more processors 905, a memory 910, one or more storage devices 915, one or more input devices 920, one or more output devices 925, and network interface 930. One or more processors 905 are, in some examples, configured to implement functionality and/or process instructions for execution within the computer system 900. For example, the processors 905 may process instructions stored in memory 910 and/or instructions stored on storage devices 915. Such instructions may include components of an operating system 935 or software applications 940. Computer system 900 may also include one or more additional components not shown in FIG. 9, such as a housing, power supply, battery, global positioning system (GPS) receiver, and so forth.

Memory 910, according to one example, is configured to store information within the computer system 900 during operation. Memory 910, in some example embodiments, may refer to a non-transitory computer-readable storage medium or a computer-readable storage device. In some examples, memory 910 is a temporary memory, meaning that a primary purpose of memory 910 may not be long-term storage. Memory 910 may also refer to a volatile memory, meaning that memory 910 does not maintain stored contents when memory 910 is not receiving power. Examples of volatile memories include random access memories (RAM), dynamic random access memories (DRAM), static random access memories (SRAM), and other forms of volatile memories known in the art. In some examples, memory 910 is used to store program instructions for execution by the processors 905. Memory 910, in one example, is used by software (e.g., the operating system 935 or applications 940). Generally, software applications 940 refer to software applications suitable for implementing at least some operations of the methods for providing a location-based gaming experience as described herein.

One or more storage devices 915 can also include one or more transitory or non-transitory computer-readable storage media and/or computer-readable storage devices. In some embodiments, storage devices 915 may be configured to store greater amounts of information than memory 910. Storage devices 915 may further be configured for long-term storage of information. In some examples, the storage devices 915 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Still referencing to FIG. 9, the computer system 900 may also include one or more input devices 920. The input devices 920 may be configured to receive input from a user through tactile, audio, video, or biometric channels. Examples of input devices 920 may include a keyboard, keypad, mouse, trackball, touchscreen, touchpad, microphone, one or more video cameras, image sensors, fingerprint sensors, or any other device capable of detecting an input from a user or other source, and relaying the input to computer system 900, or components thereof.

The output devices 925, in some examples, may be configured to provide output to a user through visual or auditory channels. Output devices 925 may include a video graphics adapter card, a liquid crystal display (LCD) monitor, a light emitting diode (LED) monitor, an organic LED monitor, a sound card, a speaker, a lighting device, a LED, a projector, or any other device capable of generating output that may be intelligible to a user. Output devices 925 may also include a touchscreen, presence-sensitive display, or other input/output capable displays known in the art.

The computer system 900, in some example embodiments, also includes network interface 930. The network interface 930 can be utilized to communicate with external devices via one or more data networks such as one or more wired, wireless, or optical networks including, for example, the Internet, intranet, LAN, WAN, cellular phone networks, Bluetooth radio, and an IEEE 902.11-based radio frequency network, among others. The network interface 930 may be a network interface card, such as an Ethernet card, an optical transceiver, a radio frequency transceiver, or any other type of device that can send and receive information.

The operating system 935 may control one or more functionalities of computer system 900 and/or components thereof. For example, the operating system 935 may interact with the applications 940 and may facilitate one or more interactions between the applications 940 and components of the computer system 900. As shown in FIG. 9, the operating system 935 may interact with or be otherwise coupled to the application(s) 940 and components thereof. In some embodiments, application(s) 940 may be included in operating system 935. In these and other examples, virtual modules, firmware, or software may be part of the applications 940.

Thus, methods of and systems for recognizing and performing voice commands during advertisement have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for recognizing and performing voice commands during advertisements, the system comprising:
    an audio device configured to play a media stream to a user, the media stream including at least one advertisement;
    at least one acoustic sensor configured to sense an ambient acoustic signal; and
    one or more processors communicatively coupled to the audio device and the at least one acoustic sensor, the one or more processors being configured to:
        determine that the audio device has started playing the at least one advertisement;
        in response to the determination, monitor the ambient acoustic signal to detect, based on the ambient acoustic signal, a presence of at least one command spoken by the user; and
        in response to the detection of the presence of the at least one command, cause the audio device to perform one or more actions associated with the at least one command.

2. The system of claim 1, wherein:
    the media stream includes metadata indicative of starting the at least one advertisement; and
    the determination that the audio device has started playing the at least one advertisement is based on the metadata.

3. The system of claim 1, wherein the one or more processors are configured to analyze audio data of the media stream; and
    wherein the determination that the audio device has started playing the at least one advertisement is based on the analysis of the audio data.

4. The system of claim 1, wherein the detection of the presence of the at least one command includes:
    analyzing the ambient acoustic signal to detect a presence of a pre-determined keyword in the ambient acoustic signal; and
    upon detection of the presence of the at least one keyword, analyzing a portion of the ambient acoustic signal after the pre-determined keyword to recognize the at least one command.

5. The system of claim 4, wherein upon detection of the presence of the pre-determined keyword, the one or more processors are configured to cause the audio device to lower a level of sound of playing the media stream.

6. The system of claim 1, wherein the detection of the presence of the at least one command includes comparing a portion of the ambient acoustic signal to one or more phrases stored in a local vocabulary, the local vocabulary being stored in a memory of the audio device.

7. The system of claim 6, wherein the one or more processors are communicatively connected to at least one remote computing source, the at least one remote computing source being configured to store a remote vocabulary, wherein the remote vocabulary is larger than the local vocabulary; and
    wherein the one or more processors are configured to:
        determine that the portion of the ambient acoustic signal does not match the one or more phrases stored in the local vocabulary; and
        in response to the determination, comparing the portion of the ambient acoustic signal to one or more phrases stored in the remote vocabulary.

8. The system of claim 1, wherein the one or more processors are configured to:
    determine data associated with the at least one advertisement; and
    prior to causing the audio device to perform the actions, modify the at least one command based on the data associated with the at least one advertisement.

9. The system of claim 8, wherein the one or more processors are configured to:
    perform speech recognition based on an audio data of the media stream, the audio data corresponding to the at least one advertisement; and
    determine, based on results of the speech recognition, the data associated with the at least one advertisement.

10. The system of claim 8, wherein:
    the media stream includes metadata including the data associated with the at least one advertisement; and
    the one or more processors are configured to determine the data associated with the at least one advertisement based on the metadata.

11. The system of claim 8, wherein the data associated with the at least one advertisement include one or more of the following: a phone number, an Internet address of a website, a name of product or a service, a type of the product or the service, a name of company, and a street address of the company.

12. The system of claim 11, wherein the performing one or more actions corresponding to the at least one command includes one or more of: making a call to the phone number, opening a browser at the Internet address of a website, displaying a map showing the address of the company, displaying a driving direction to the street address of the company, and displaying an information concerning the product or the service in the browser.

13. The system of claim 1, wherein the at least one acoustic sensor and the one or more processors are integrated in the audio device.

14. The system of claim 1, wherein the audio device includes one of: a smart phone, a smart television set, a tablet computer, a desktop computer, in-vehicle infotainment, and a smart home device.

15. The system of claim 1, wherein the media stream includes an Internet radio stream, an Internet television stream broadcast live online, or a podcast.

16. The system of claim 1, wherein after determining that the audio device has started playing the at least one advertisement, the one or more processors are configured to:
   detect a presence of at least one clue in the at least one advertisement;
   in response to the detection of the at least one clue, monitor the ambient acoustic signal to detect, based on the ambient acoustic signal, a presence of at least one keyword spoken by the user, the at least one keyword being associated with the at least one clue; and
   in response to the detection of the presence of the at least one keyword, cause the audio device to perform one or more actions associated with the at least one clue.

17. A method for recognizing and performing voice commands during advertisement, the method comprising:
   playing, by an audio device, a media stream to a user, the media stream including at least one advertisement;
   sensing, by at least one acoustic sensor, an ambient acoustic signal;
   determining, by one or more processors communicatively coupled to the audio device and the at least one acoustic sensor, that the audio device has started playing the at least one advertisement;
   in response to the determination, monitoring, by the one or more processors, the ambient acoustic signal to detect, based on the ambient acoustic signal, a presence of at least one command spoken by the user; and
   in response to the detection of the presence of the at least one command, causing, by the one or more processors, the audio device to perform one or more actions associated with the at least one command.

18. The method of claim 17, wherein the detection of the presence of the at least one command includes:
   analyzing the ambient acoustic signal to detect a presence of a pre-determined keyword in the ambient acoustic signal; and
   upon detection of the presence of the at least one keyword, analyzing a portion of the ambient acoustic signal after the pre-determined keyword to recognize the at least one command.

19. The method of claim 17, further comprising:
   determining data associated with the at least one advertisement, wherein the data associated with the at least one advertisement are determined by at least one of:
      performing speech recognition of audio data of the media stream, the audio data corresponding to the at least one advertisement; and
      reading metadata of the media stream; and
   prior to causing the audio device to perform the actions, modifying the at least one command based on the data associated with the at least one advertisement.

20. An audio device for recognizing and performing voice commands during advertisements, the audio device comprising:
   an output device configured to play a media stream to a user, the media stream including at least one advertisement;
   at least one acoustic sensor configured to sense an ambient acoustic signal; and
   one or more processors communicatively coupled to the output device and the at least one acoustic sensor and configured to:
      determine that the output device has started playing the at least one advertisement;
      in response to the determination:
         monitor the ambient acoustic signal to detect a presence of a predetermined keyword spoken by the user in the ambient acoustic signal;
         in response to the detection of the presence of the pre-determined keyword:
            cause the output device to lower a level of a sound of playing the media stream; and
            analyze a portion of the ambient acoustic signal after the pre-determined keyword to recognize at least one command; and
      upon recognition of the at least one command:
         determine data associated with the at least one advertisement, wherein the data associated with the at least one advertisement are determined by at least one of:
            performing speech recognition of audio data of the media stream, the audio data corresponding to the at least one advertisement; and
            reading metadata of the media stream; and
         perform one or more actions associated with the one or more command and the data associated with the at least one advertisement.

* * * * *